(12) United States Patent
Evans (10) Patent No.: US 9,044,028 B2
(45) Date of Patent: Jun. 2, 2015

(54) NON-PENETRATING CAPTIVE BOLT ANIMAL PROCESSING

(75) Inventor: Robert D. Evans, Wayzata, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 301 days.

(21) Appl. No.: 13/639,691

(22) PCT Filed: Apr. 8, 2011

(86) PCT No.: PCT/US2011/031805
§ 371 (c)(1),
(2), (4) Date: Oct. 5, 2012

(87) PCT Pub. No.: WO2011/127415
PCT Pub. Date: Oct. 13, 2011

(65) Prior Publication Data
US 2013/0023190 A1  Jan. 24, 2013

Related U.S. Application Data

(60) Provisional application No. 61/322,050, filed on Apr. 8, 2010.

(51) Int. Cl.
*A22B 3/00* (2006.01)
*A22B 3/02* (2006.01)

(52) U.S. Cl.
CPC ........................................ *A22B 3/02* (2013.01)

(58) Field of Classification Search
USPC .............. 452/52, 57, 60–65, 166–170; 89/25; 42/1.12, 1.14, 8, 12, 36, 44, 64
See application file for complete search history.

(56) References Cited

U.S. PATENT DOCUMENTS

| 3,068,601 | A |   | 12/1962 | Arrowsmith |           |
|-----------|---|---|---------|------------|-----------|
| 4,219,905 | A |   | 9/1980  | Thacker et al. |       |
| 4,280,248 | A | * | 7/1981  | Herubel    | 452/62    |
| 4,497,377 | A |   | 2/1985  | Haytayan   |           |
| 4,557,627 | A | * | 12/1985 | Schmid et al. | 405/146 |
| 4,575,900 | A |   | 3/1986  | Hamel et al. |         |

(Continued)

FOREIGN PATENT DOCUMENTS

WO  WO2011/127415  10/2011

OTHER PUBLICATIONS

PCT International Search Report PCT/US2011/031805 mailed Sep. 1, 2011. 1 page.
"CASH Special" & "Short cash Special Stunners", [online], retrieved from: http://www.acclesandshelvoke.co.uk/media/Cash%20Special%20Safe%20Operating%20&%20Cleaning%20Instructions%20A4.pdf, 6 pages.
"CASH" .22 Poultry Killer Cartridge Powered Tool (CPK2), [online], retrieved from: http://www.acclesandshelvoke.co.uk/media/Poultry%20Killer%20.

(Continued)

*Primary Examiner* — Richard Price, Jr.

(57) ABSTRACT

Animal processing devices and methods for processing animals with such devices are described. An animal processing device comprises a housing having a power source for driving a bolt for impacting a predetermined portion of the head of an animal, a trigger for activating the bolt, and a nosepiece. The nosepiece comprises a first portion that is non-moveably positioned relative to the housing. The first portion comprises an opening positioned along the driving direction so the end of the holt can move through the opening, and a contacting surface at an end of the first portion. The contacting surface may include a cutout region having a shape related to the shape of the predetermined portion of the head of the animal to be processed and can accommodate the predetermined portion of the head of the animal to be processed.

14 Claims, 9 Drawing Sheets

(56) References Cited

U.S. PATENT DOCUMENTS

| | | | | |
|---|---|---|---|---|
| 4,625,442 A | * | 12/1986 | Hill et al. | 42/1.12 |
| 4,631,779 A | * | 12/1986 | Castiello | 42/1.12 |
| 5,152,713 A | * | 10/1992 | Baertlein | 452/64 |
| 5,692,951 A | | 12/1997 | Huff | |
| 6,135,871 A | | 10/2000 | Jones | |
| 8,821,221 B1 | * | 9/2014 | Bock | 452/65 |
| 2004/0209562 A1 | | 10/2004 | Jones | |

OTHER PUBLICATIONS

22%20Safe%20Operating,%20Cleaning%20&%20Maintenance%20Instructions%20A4.pdf, 13 pages.

"Humane Alternative Developed for Rabbit Stunning", Livestock welfare insight, [online], retrieved from: http://www.livestockwelfare.com/insights/insightssum06.pdf, 8 pages.

* cited by examiner

NON-PENETRATING CAPTIVE BOLT ANIMAL PROCESSING

CROSS-REFERENCE TO RELATED APPLICATIONS

This application claims benefit of international application PCT/US2011/031805, filed Apr. 8, 2011, which application claims priority to U.S. Provisional Application 61/322,050, filed Apr. 8, 2010, which applications are hereby incorporated by reference herein in their entirety.

PRIORITY

The present non-provisional patent Application claims the benefit of U.S. Provisional Patent Application having Ser. No. 61/322,050, filed on Apr. 8, 2010, entitled NON-PENETRATING CAPTIVE BOLT ANIMAL PROCESSING, wherein the entirety of said provisional patent application is incorporated herein by reference.

TECHNICAL FIELD

The present invention lates to animal processing devices. More specifically the present invention relates to stunning devices that stun an animal by impacting the animal with a moving bolt.

BACKGROUND

In livestock and meat processing operations, an incoming animal is first stunned by striking the animal with a device designed to deliver a concussive blow. The animal thereafter is typically exsanguinated and further processed. Early methods used a hand-held stunning hammer to deliver the concussive force. This method can be tiring and the hammer can be awkward to use, particularly for processing of small animals such as poultry, and especially for turkey processing because turkeys are larger and stronger.

Conventional animal slaughtering pistols use an explosive cartridge or a hydraulic or pneumatic driven mechanism that causes the instantaneous, temporary emergence of a solid or hollow cylindrical steel spike from the barrel, which perforates the forehead bone of the animal and damages the brain of the animal, so killing the animal. Other devices use a flat or convex "knocker head," which delivers concussive force to stun the animal, but does not penetrate the skull. Devices have been provided with various safety features, including a shiftable or slideable nosepiece that actuates a release when pressed against the head of an animal, thereby allowing the device to be triggered.

Various stunning pistols are known that have impact or knocker heads that extend beyond the muzzle of the device. See U.S. Pat. No. 3,068,601; US Published Application No. 2004/0209562; and U.S. Pat. No. 6,135,871, for example. Devices with a safety interlock device to prevent premature triggering are described in U.S. Pat. No. 4,575,900; US Published Application No. 2004/0209562; and U.S. Pat. No. 5,692,951, for example.

Specific prior art devices include the "CASH" Special Captive, and the CASH Poultry Killer .22 Cartridge Powered Tool, both from the Accles and Shelvoke Company in the UK. The "CASH" Special Captive bolt stunner is a pistol style trigger operated tool. The bolt of this tool extends 4¼ inches from muzzle.

SUMMARY

In an exemplary aspect of the present invention an animal processing device is provided that can be used to stun an animal as part of an animal slaughtering process. An exemplary animal processing device comprises a housing having a power source for driving a bolt along a driving direction, the bolt having a impacting surface at an end of the bolt for processing an animal by impacting a predetermined portion of the head of the animal with the impacting surface, a trigger for activating the power source, thereby causing the bolt to travel along the driving direction, and a nosepiece. The nosepiece comprises a first portion that is non-moveably positioned or otherwise fixed relative to the housing. The first portion comprises an opening configured to allow the bolt to move through the opening along the driving direction. The first portion comprises a contacting surface at an end of the first portion. The contacting surface preferably defines a cutout region having a shape related to the shape of the predetermined portion of the head of the animal to be processed and can accommodate the predetermined portion of the head of the animal to be processed. Depending on the particular animal being processed, the cutout region may vary in shape or may be omitted. The nosepiece also comprises a second portion moveably positioned relative to the first portion and that is configured to prevent firing of the bolt in a first position and to allow firing of the bolt in a second position. The exemplary device is configured so the end of the bolt travels into the cutout region when the device is fired.

A method for stunning or euthanizing an animal is also described, wherein a processing device comprising a bolt having a impacting surface and a nosepiece is provided. The nosepiece comprises a first portion that is non-moveably positioned or otherwise fixed relative to the housing. The first portion comprises an opening configured to allow the bolt to move through the opening along the driving direction. The first portion comprises a contacting surface at an end of the first portion. The contacting surface preferably defines a cutout region having a shape related to the shape of the predetermined portion of the head of the animal to be processed and can accommodate the predetermined portion of the head of the animal to be processed. Depending on the particular animal being processed, the cutout region may vary in shape or may be omitted. The nosepiece also comprises a second portion moveably positioned relative to the first portion and that is configured to prevent firing of the bolt in a first position and to allow firing of the bolt in a second position. In use, a portion of the animal to be processed is positioned within the cutout region of the first portion of the nosepiece. The second portion of the nosepiece is moved to the second position, and the bolt is driven through the central opening of the first portion so the impacting surface of the bolt impacts the predetermined portion of the head of the animal.

Because of the configuration of the nosepiece, the present animal processing device exhibits both exceptional performance and enhanced safety as compared to prior devices. The cutout region, when used, of the first portion of the nosepiece acts to accommodate the portion of the head of the animal to be processed, so that the device is seated on the portion of the head of the animal to assure effective contact of the impacting surface of the bolt with the animal. Advantageously, the cutout region provides tactile feedback to the user of the device. That is, a user can feel whether the portion of the head of the animal to be processed is properly positioned within the cutout region. Accordingly, one or both of tactile feedback and a mechanical interlock can prevent firing of the device unless the portion of the head of the animal to be processed is properly positioned within the cutout region. Inadvertent firing of the device can therefore be substantially reduced or eliminated.

Preferably, devices in accordance with the present invention are configured so the impacting surface at the end of the bolt travels into the cutout region. In embodiments where the cutout region is not used for a particular animal to be processed, the bolt preferably travels past the impacting surface by a distant sufficient to achieve the desired effect on the animal to be processed. The impacting surface may travel past the end of the second portion if needed to achieve desired performance parameters. In any event, devices are preferably configured so the distance the contacting surface travels past the end of the first portion, if at all, is minimized. For example, in an exemplary embodiment, the impacting surface of the end of the bolt is configured to extend past the end of the first portion by not more than about half an inch which is significantly less than that used with known devices. Because the impacting surface of the bolt travels into the cutout region of the first portion and impacts the animal to be stunned, but does not travel significantly past the end of the first portion when inadvertent firing occurs, devices of the present invention provides significant safety advantages.

The present invention in particular provides advantages for poultry processing. As noted above, current in-field practices generally use a striking object to apply blunt force to the head of the bird. This is often misapplied and may result in injured but not unconscious birds. Alternatively, cervical dislocation is a more consistent method, but is more difficult in larger birds such as turkeys. In preferred embodiments, the cutout of the first portion of the nosepiece comprises a shape related to the head of a poultry animal, which beneficially can afford a better fit of the device to the important structure of the head of the animal for applying effective stunning force. In a particularly preferred embodiment, the arcuate profile of the first portion of the nosepiece comprises a shape related to the shape of the calvarium of the head of a turkey.

The present invention provides consistent results across a broad range of bird sizes and is readily applicable in the field. In a preferred embodiment, the present invention advantageously provides a stunning device having cordless mobility and that is light in weight.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows.

DETAILED DESCRIPTION

The embodiments of the present invention described below are not intended to be exhaustive or to limit the invention to the precise forms disclosed in the following detailed description. Rather a purpose of the embodiments chosen and described is so that the appreciation and understanding by others having ordinary skill in the art of the principles and practices of the present invention can be facilitated.

Figure 1:
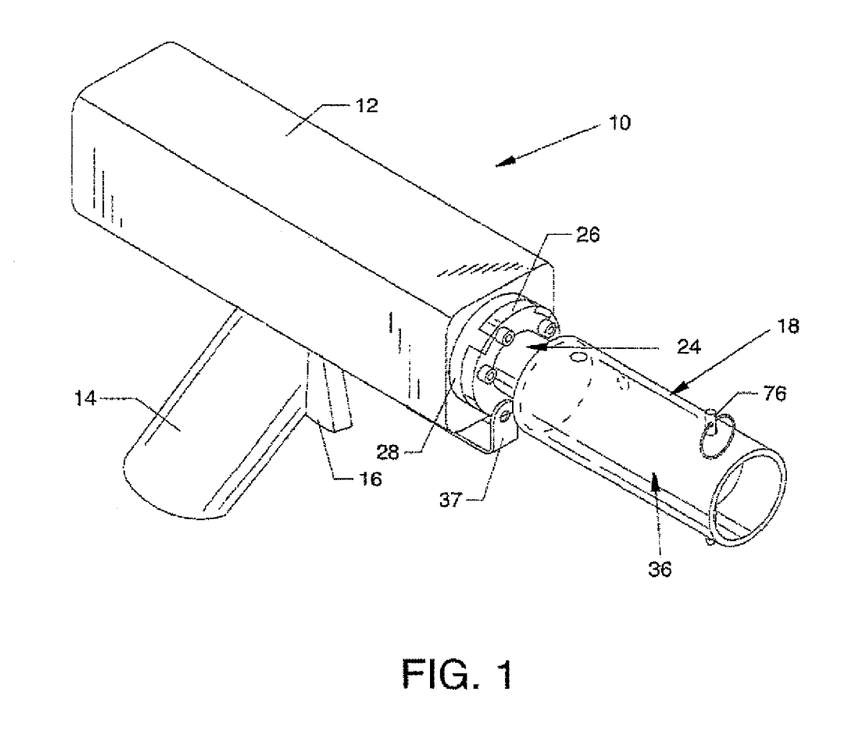
FIG. 1 is a perspective view of an animal processing device showing in particular a nosepiece in accordance with the present invention.
Figure 2:
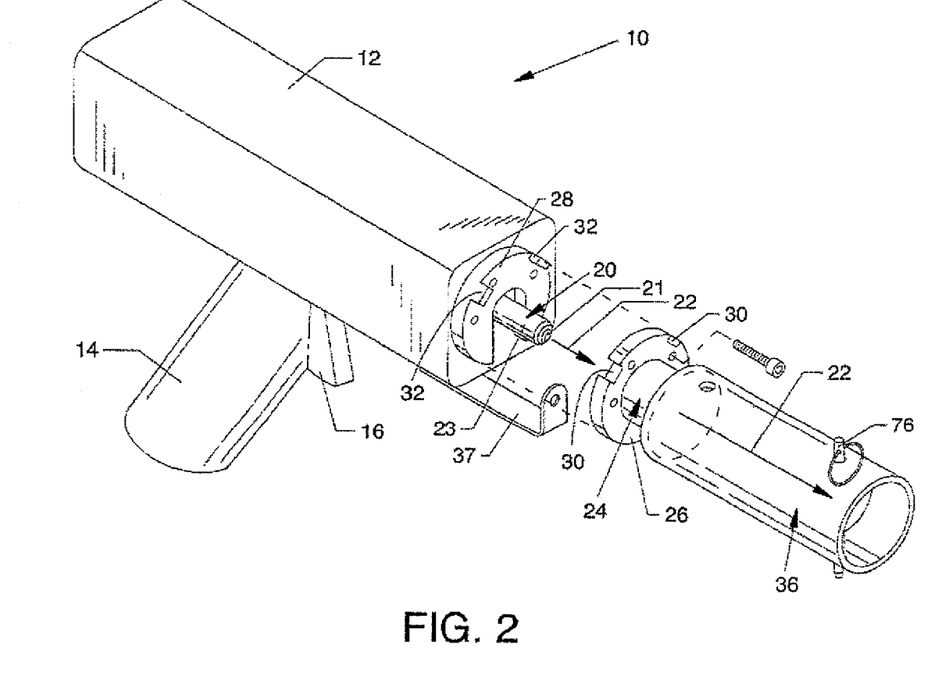
FIG. 2 is a perspective view of the device shown in FIG. 1 showing the nosepiece separated from the device.

Referring to FIGS. 1 and 2 initially, device 10 is illustrated. As shown, device 10 comprises housing 12, handle 14, trigger 16, and nosepiece 18. Housing 12 includes a power source (not shown) for driving bolt 20 along a driving direction indicated by reference numeral 22 as activated by trigger 16. An exemplary power source comprises a pneumatic power source. Any power source capable of sufficiently driving bolt 20 so impacting surface 21 at end 23 of bolt 20 can achieve the desired effect on an animal being processed can be used such as power sources comprising solenoids, springs, hydraulics, explosives, MAP gas, batteries, and those that provide the same function, and combinations thereof.

In an exemplary embodiment of the present invention, a conventional cordless pneumatic nail gun can be used to provide housing 12, handle 14, trigger 16, and a power source. In accordance with the present invention, nosepiece 18 is integrated with the pneumatic nail gun. The nail gun provides a safety mechanism to prevent unintended firing, and a blunt captive bolt that can be configured to apply a consistent blow to a predetermined portion of the head of an animal to provide a stunning function during processing of the animal. One exemplary nail gun that can be used is in the Hitachi NT 65 GA. Nail guns with specifications similar to the Hitachi NT 65 GA can also be used.

With reference to FIG. 2, nosepiece 18 is illustrated as detached from housing 12. Nosepiece 18 includes base 24 having mounting flange 26 that mates with mounting hub 28 of housing 12 using any suitable connection technique such as by using conventional fasteners. To provide alignment between nosepiece 18 and housing 12 mounting flange 26 includes notches 30 that engage with tabs 32 of mounting hub 28. Providing such alignment positions nosepiece 18 in a predetermined orientation relative to housing 12 and handle 14. Such alignment is optional and the illustrated alignment technique including notches 30 and tabs 32 is exemplary and any suitable technique can be used to provide such alignment.

Figure 3:
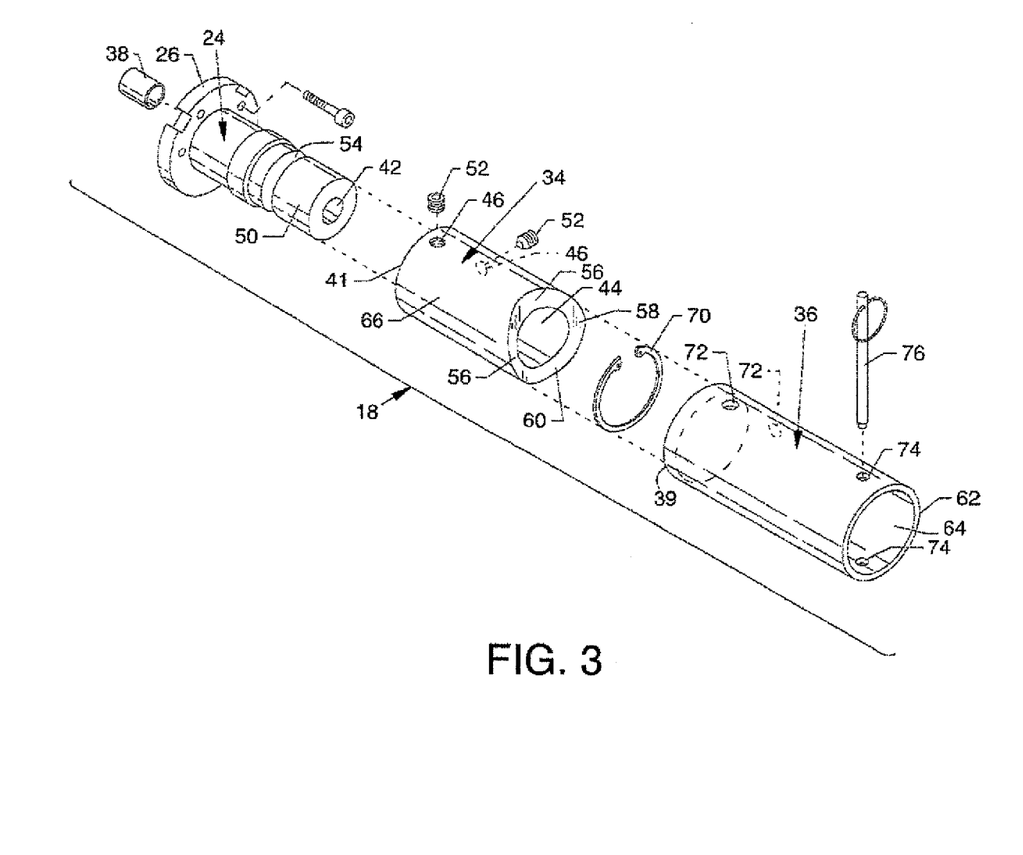
FIG. 3 is a perspective exploded view of the nosepiece of the device shown in FIGS. 1 and 2.
Figure 4:
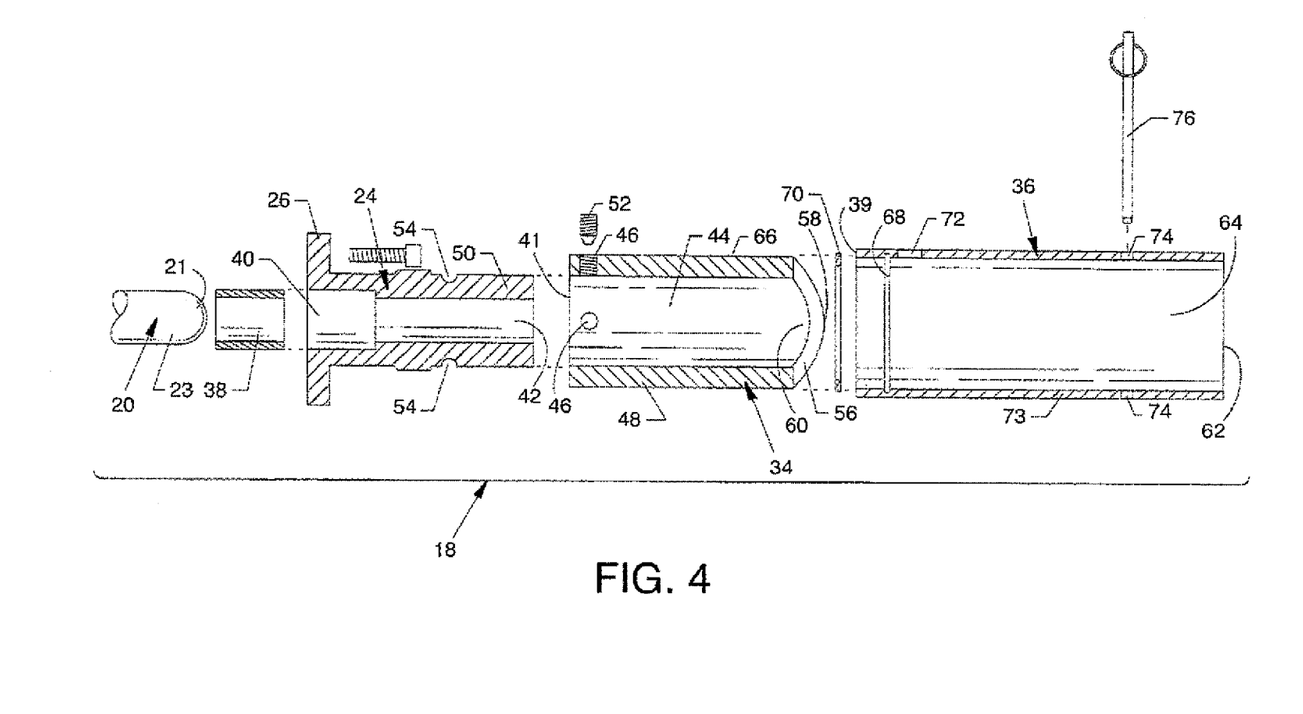
FIG. 4 is a cross-sectional exploded side view of the nosepiece of the device shown in FIGS. 1 and 2.
Figure 5:
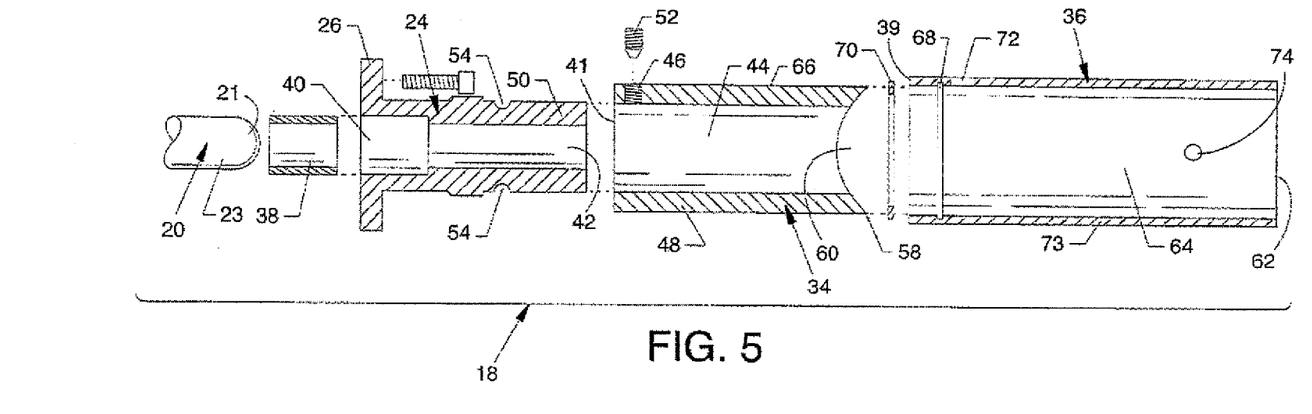
FIG. 5 is a cross-sectional exploded top view of the nosepiece of the device shown in FIGS. 1 and 2.

Next referring to the exploded view of FIG. 3, the exploded side cross-sectional view of FIG. 4, and the exploded top cross-sectional view of FIG. 5, nosepiece 18 is illustrated in greater detail. In particular, nosepiece 18 comprises base 24, first portion 34, and second portion 36.

Base 24 includes bushing 38 that is provided in bore 40 of base 24 and that comprises an inside diameter to provide a desired fit with the outside surface of bolt 20. Preferably the fit between bushing 38 and bolt 20 provides a close sliding fit to support and guide bolt 20 along driving direction 22. Base 24 also includes passageway 42 through which bolt 20 travels when bolt 20 is driven along driving direction 22 during use of device 10. Preferably, the inside diameter of passageway 42 is sufficiently larger than the inside diameter of bushing 38 to prevent interference between the outside surface of bolt 20 and passageway 42.

First portion 34 comprises a sleeve having passageway 44 through which bolt 20 travels when bolt 20 is driven along driving direction 22 during use of device 10. As shown, threaded holes 46 are provided through wall 48 of first portion 34. When assembled, passageway 44 of first portion 34 receives shaft portion 50 of base 24. Set screws 52 are positioned in threaded holes 46 and engage with locking groove 54 of shaft 50 thereby locking first portion 34 relative to base 24 as can be seen best in the side cross-sectional view of FIG. 6. First portion 34 and base 24 may be combined into one component such as is described below with reference to FIG. 9. Note, first portion 34 and base 24 may be provided by any number of components that provide the desired functionality described herein.

First portion 34 additionally comprises contacting surface 56 at end 58 of first portion 34. Preferably, contacting surface 56 is designed to engage with a predetermined portion of an animal to be processed with device 10. Contacting surface 56 is therefore preferably designed to have a shape related to the predetermined portion of the animal to be processed. Accordingly, contacting surface 56 preferably comprises a cutout region 60 that may comprise a negative replica or approximation of the shape of the predetermined portion of the animal to be processed and may also comprise any amount of detail desired. Contacting surface 56 typically comprises a concave region for engagement with a portion of the head of an animal to be processed with device 10. For example, when device 10 is used for processing poultry animals such as turkeys, cutout region 60 preferably comprises a shape that is a negative approximation of the shape of the calvarium of a typical turkey. The preferred approximated shape for use with a turkey is generally concave as can be seen in the top cross-sectional view of first portion 34 shown in FIG. 5. Contacting surface 56 may comprise any desired shape sufficient to provide the desired effect on the animal to be processed. Cutout region 60 may not be required for processing of certain animals. In this case, contacting surface 56 may comprise a convex profile or any other desired profile including a flat profile. It is further contemplated that contacting surface 56 may comprise any desired surface treatment and/or surface structure. Additionally, contacting surface 56 may include features that improve the ability of contacting surface 56 to engage with an animal to be processed. For example, contacting surface 56 may include gripping features such as raised portions, ridges, sharpened features, and the like that to help prevent contacting surface 56 from slipping during engagement with an animal to be processed.

Figure 6:
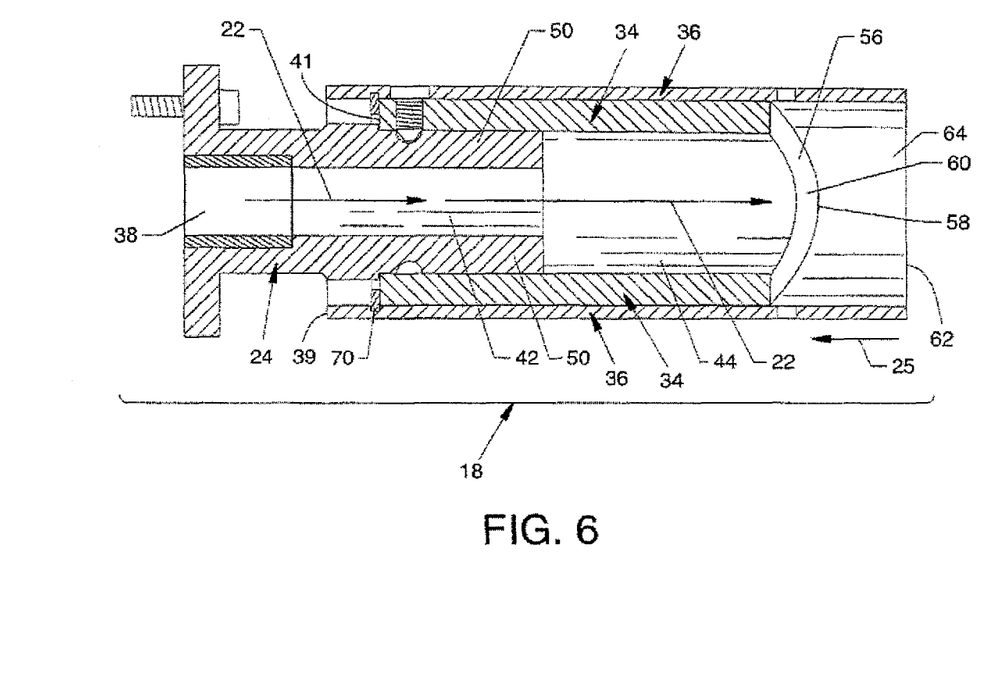
FIG. 6 is a cross-sectional view of the nosepiece of the device shown in FIGS. 1 and 2 in an assembled configuration.

With further reference to the exploded cross-sectional views of FIGS. 4 and 5 and the assembled cross-sectional view of FIG. 6, second portion 36 comprises a sleeve having end 62 and passageway 64 that slidingly engages with outside surface 66 of first portion 34. Passageway 64 includes groove 68 that receives retaining ring 70, the function of which is described below. As seen best in FIG. 3, second portion 36 includes openings 72 that pass through wall 73 and allow access to set screws 52 in the assembled configuration of nosepiece 18. Additionally, second portion 36 includes openings 74 that pass through wall 73 and receive pin 76.

Figure 7:
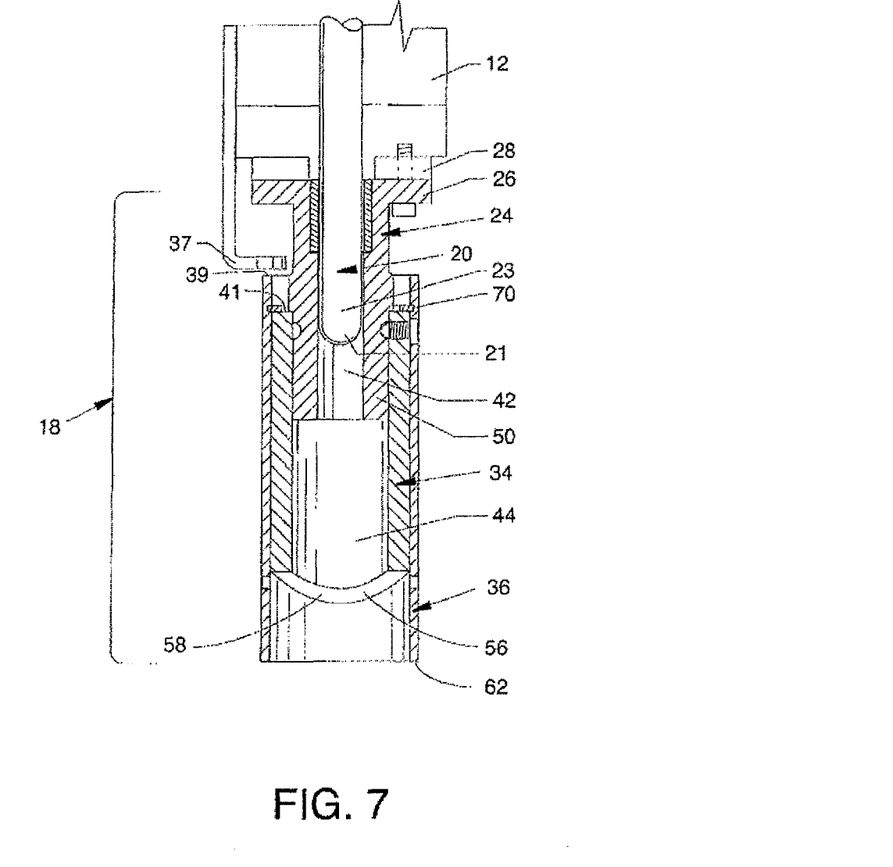
FIG. 7 is a cross-sectional view of the device shown in FIG. 1 in a first configuration where the device cannot be fired.

Now referring to FIG. 7, nosepiece 18 is shown in a first configuration where bolt 20 cannot be driven along driving direction 22. That is, the power source cannot be activated when nosepiece 18 is in this first configuration. In the illustrated first configuration, first portion 34 of nosepiece 18 is locked relative to base 24 by engagement of set screws 52 with locking feature 54. Second portion 36 of nosepiece 18 is in a first extended position where firing of bolt 20 is not permitted and where bolt 20 is in a retracted position. In this first position of second portion 36, arm 37 provides a spring force against end 39 of second portion 36 and pushes second portion 36 so end 62 of second portion 36 is past end 58 of first portion 34. In addition, when second portion 36 is in the first position, retaining ring 70 engages with end 41 of first portion 34 and accordingly functions as a stop. The position of arm 37 controls activation of the power source with an appropriate interlock such as a mechanical or electronic interlock device. In the illustrated first configuration of nosepiece 18 shown in FIG. 7, arm 37 is in a position that prevents activation of the power source.

Figure 8:
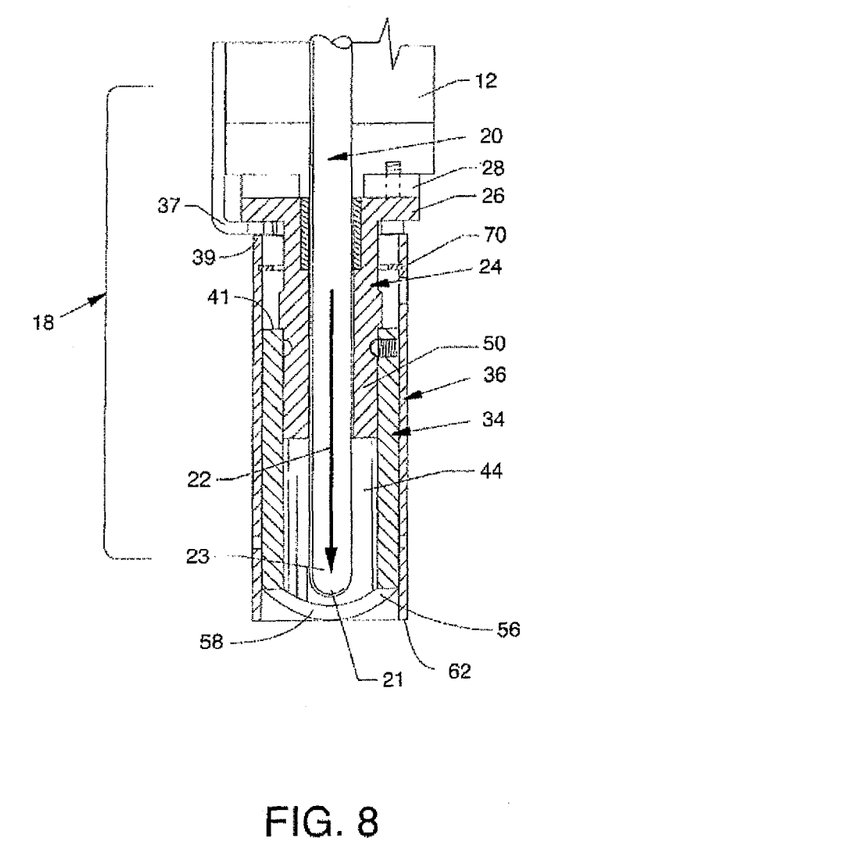
FIG. 8 is a cross-sectional view of the device shown in FIG. 1 and a second configuration where the device has been fired.

Next referring to FIG. 8, nosepiece 18 is shown in a second configuration where bolt 22 is in an operative position for processing an animal with device 10. In this configuration the power source has been activated and bolt 20 is shown in an extended position. First portion 34 of nosepiece 18 remains fixed relative to base 24 and does not move. Second portion 36 is shown in a second retracted position where firing of bolt 20 is permitted. In this second position of second portion 36, arm 37 has been translated toward housing 12 and overrides the interlock to allow activation of the power source. In an exemplary embodiment, nosepiece 18 is configured so end 23 of bolt 20 can travel into cutout region 60. In this configuration end 23 of bolt 20 may travel past end 62 of second portion 36. In embodiments where the cutout region is not used for a particular animal to be processed, the bolt preferably travels past the impacting surface by a distant sufficient to achieve the desired effect on the animal to be processed.

The amount by which end 23 can travel past end 62, if desired, can be determined by considering one or more of the size of the portion of the animal to be processed, the shape of the portion of the animal to be processed, the anatomy of the animal to be processed, and the velocity of bolt 20, for example. In one exemplary embodiment, end 23 of bolt 20 of second portion 36 can travel past end 62 by less than about 1 inch and more preferably by about ½ inch. The amount by which end 23 can travel past end 62 can also be determined by empirical methods. In another exemplary embodiment, nosepiece 18 is configured so end 23 of bolt 20 is permitted to travel into cutout region 60 but not past end 62 of second portion 36.

Figure 9:
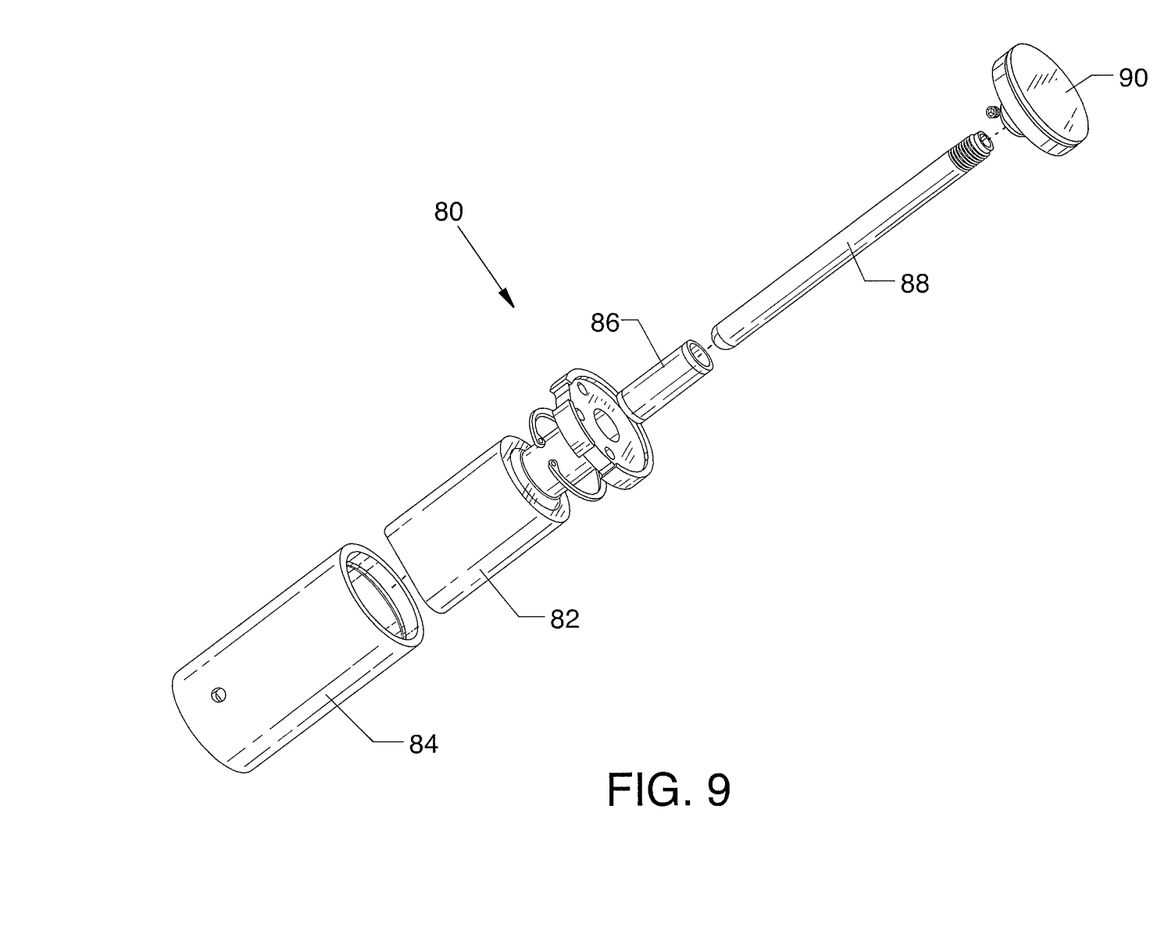
FIG. 9 is an exploded view of another animal processing device in accordance with the present invention.

FIG. 9 illustrates another device 80 in accordance with the present invention. Device 80 includes base 82, safety sleeve 84, bushing 86, bolt 88, and piston 90. Device 80 is similar to device 10 described above except base 24 and first portion 34 are provided as a single component identified as base 82 in FIG. 9.

In use, end 62 of second portion 36 is positioned against a predetermined portion of the head of an animal to be processed. Force is applied thereby causing second portion 36 to slide relative to first portion 34 and in a direction opposite of driving direction 22 and identified by reference numeral 25. Second portion 36 is translated until arm 37 engages with flange 26. In this position, the predetermined portion of the head of the animal is received within cutout region 60 of first portion 34 and is in contact with at least a portion of contacting surface 56 of first portion 34. Also, in this position the interlock is overridden and firing of bolt 22 permitted.

Trigger 16 is used to activate firing of bolt 22, which travels along driving direction 22 until impacting surface 21 of end 23 of bolt 22 impacts the predetermined portion of the head of the animal being processed. After the animal has been processed contact between the animal and end 62 is released and the spring force of arm 37 functions to return second portion 36 to the first position.

All percentages and ratios used herein are weight percentages and ratios unless otherwise indicated. All patents, patent applications (including provisional applications), and publications cited herein are incorporated by reference as if individually incorporated for all purposes. Numerous characteristics and advantages of the invention meant to be described by this document have been set forth in the foregoing description. It is to be understood, however, that while particular forms or embodiments of the invention have been illustrated, various modifications, including modifications to shape, and arrangement of parts, and the like, can be made without departing from the spirit and scope of the invention.

What is claimed is:

1. An animal processing device comprising:
   a) a housing having a power source for driving a bolt along a driving direction, the bolt having an impacting surface at an end of the bolt for processing an animal by impacting a predetermined portion of the head of the animal with the impacting surface;
   b) a trigger for activating the power source, thereby causing the bolt to travel along the driving direction;
   c) a nosepiece comprising:
      i) a first portion non-moveably positioned relative to the housing, the first portion comprising an opening configured to allow the bolt to move through the opening along the driving direction, the first portion comprising a contacting surface at an end of the first portion, the contacting surface defining a cutout region having a shape related to the shape of the predetermined portion of the head of the animal to be processed and that can accommodate the predetermined portion of the head of the animal to be processed, wherein the first portion comprises a sleeve, wherein the first portion is engaged with a base, wherein the base comprises a shaft portion and a flange, and wherein the first portion is engaged with the shaft portion and the flange is attached to a hub of the housing; and
      ii) a second portion moveably positioned relative to the first portion and configured to prevent driving of the bolt when the second portion is in a first position and to allow driving of the bolt when the second portion is in a second position;
      wherein the device is configured so the end of the bolt travels into the cutout region when the device is fired.

2. The device of claim 1, wherein the power source comprises a pneumatic power source.

3. The device of claim 1, wherein the second portion comprises a sleeve slidingly engaged with the first portion.

4. The device of claim 3, wherein the second portion comprises a retaining ring positioned inside the sleeve and that can contact an end of the first portion to provide a hard stop to sliding motion of the second portion relative to the first portion.

5. The device of claim 1, comprising an arm that can engage with an end of the second portion and preload the second portion in a position wherein an interlock prevents firing of the bolt.

6. The device of claim 1, wherein the cutout region comprises a shape related to the head of a turkey.

7. The device of claim 1, wherein the first portion and the base comprise a single component.

8. An animal processing device comprising a modified nail gun comprising:
   a) a housing, bolt, and power source;
   b) a trigger for activating the power source, thereby causing the bolt to travel along the driving direction;
   c) a nosepiece comprising:
      i) a first portion non-moveably positioned relative to the housing, the first portion comprising an opening configured to allow the bolt to move through the opening along a driving direction, the first portion comprising a contacting surface at an end of the first portion, the contacting surface defining a cutout region having a shape related to the shape of a predetermined portion of the head of an animal to be processed and that can accommodate the predetermined portion of the head of the animal to be processed, wherein the first portion comprises a sleeve, wherein the first portion is engaged with a base, wherein the base comprises a shaft portion and a flange, and wherein the first portion is engaged with the shaft portion and the flange is attached to a hub of the housing; and
      ii) a second portion moveably positioned relative to the first portion and configured to prevent driving of the bolt when the second portion is in a first position and to allow driving of the bolt when the second portion is in a second position;
      wherein the device is configured so the end of the bolt travels into the cutout region when the device is fired.

9. The device of claim 8, wherein the second portion comprises a sleeve slidingly engaged with the first portion.

10. The device of claim 9, wherein the second portion comprises a retaining ring positioned inside the sleeve and that can contact an end of the first portion to provide a hard stop to sliding motion of the second portion relative to the first portion.

11. The device of claim 8, comprising an arm that can engage with an end of the second portion and preload the second portion in a position wherein an interlock prevents firing of the bolt.

12. The device of claim 8, wherein the cutout region comprises a shape related to the head of a turkey.

13. A method for processing an animal, comprising:
   a) providing an animal processing device, the device comprising a nosepiece and a bolt having an impacting surface, the nosepiece having:
      i) a first portion non-moveably positioned relative to the housing, the first portion comprising an opening configured to allow the bolt to move through the opening along the driving direction, the first portion comprising a contacting surface at an end of the first portion, the contacting surface defining a cutout region having a shape related to the shape of the predetermined portion of the head of the animal to be processed and that can accommodate the predetermined portion of the head of the animal to be processed, wherein the first portion comprises a sleeve, wherein the first portion is engaged with a base, wherein the base comprises a shaft portion and a flange, and wherein the first portion is engaged with the shaft portion and the flange is attached to a hub of the housing; and
      ii) a second portion moveably positioned relative to the first portion and configured to prevent driving of the bolt when the second portion is in a first position and to allow driving of the bolt when the second portion is in a second position;
   b) positioning the predetermined portion of the animal within the cutout region of the first portion of the nosepiece;
   c) moving the second portion of the nosepiece to the second position; and
   d) driving the bolt through the opening of the first portion so the impacting surface of the bolt impacts the predetermined portion of the head of the animal.

14. The method of claim 13, comprising stunning the animal.

* * * * *

UNITED STATES PATENT AND TRADEMARK OFFICE
CERTIFICATE OF CORRECTION

| | | |
|---|---|---|
| PATENT NO. | : 9,044,028 B2 | Page 1 of 1 |
| APPLICATION NO. | : 13/639691 | |
| DATED | : June 2, 2015 | |
| INVENTOR(S) | : Robert D. Evans | |

It is certified that error appears in the above-identified patent and that said Letters Patent is hereby corrected as shown below:

On the title page item (75), in column 2, under ABSTRACT, line 9, delete "holt" and insert -- bolt --, therefor.

Signed and Sealed this
Ninth Day of February, 2016

Michelle K. Lee
*Director of the United States Patent and Trademark Office*